May 23, 1972 L. KONDUR 3,664,701
SAFETY BUMPER FOR DRIVERLESS VEHICLE
Filed Nov. 12, 1970 2 Sheets-Sheet 1

INVENTOR
LOUIS KONDUR
BY
Harley Forster & Harley
ATTORNEYS

May 23, 1972  L. KONDUR  3,664,701
SAFETY BUMPER FOR DRIVERLESS VEHICLE
Filed Nov. 12, 1970  2 Sheets-Sheet 2
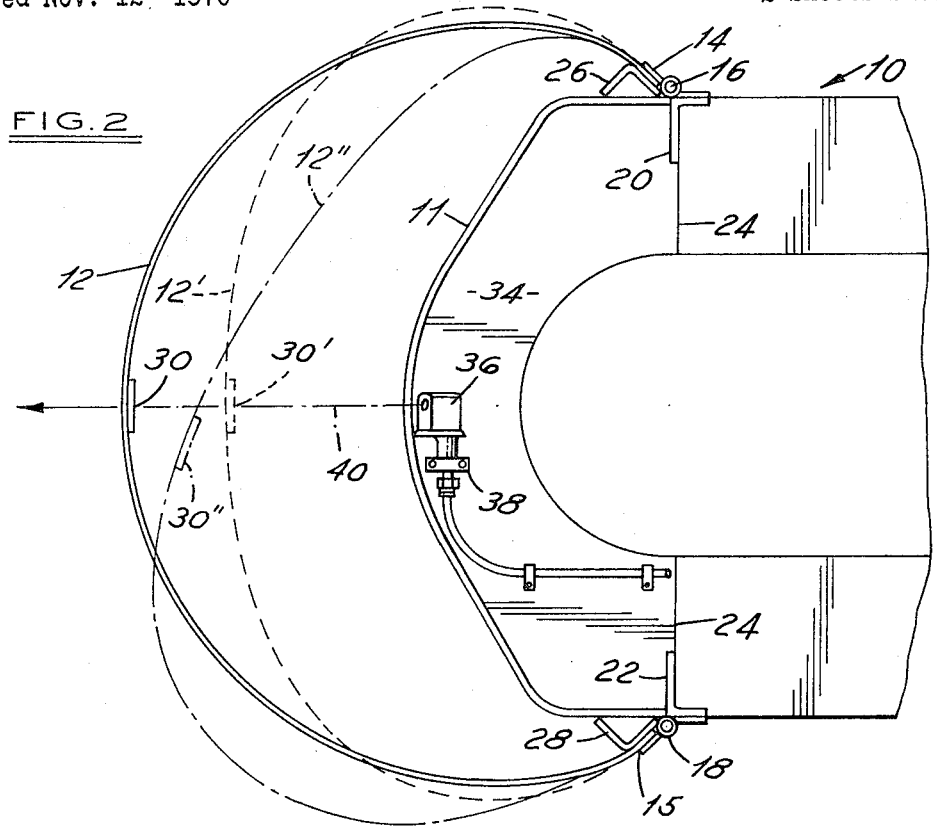
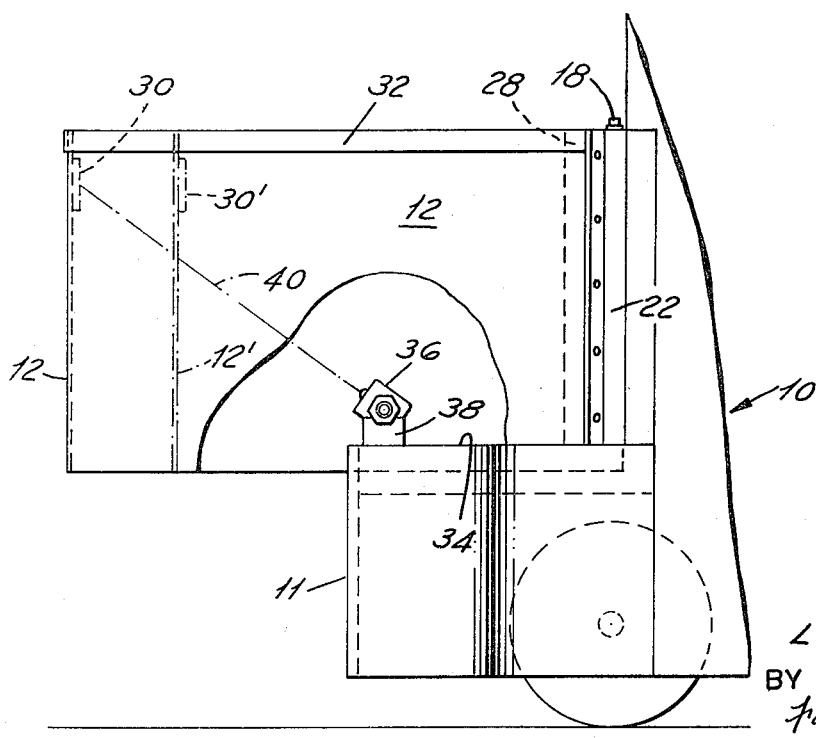
INVENTOR
LOUIS KONDUR
BY
Farley Forster & Farley
ATTORNEYS

United States Patent Office 3,664,701
Patented May 23, 1972

3,664,701
SAFETY BUMPER FOR DRIVERLESS VEHICLE
Louis Kondur, Birmingham, Mich., assignor to
Jervis B. Webb Company
Filed Nov. 12, 1970, Ser. No. 88,634
Int. Cl. B60r 19/02, 21/02
U.S. Cl. 293—4
12 Claims

ABSTRACT OF THE DISCLOSURE

A driverless self-propelled industrial vehicle is provided with a deflectable safety bumper and a vehicle stopping control which includes a photoelectric scanner on the vehicle and a reflector on the bumper to sense deflection thereof and automatically stop the vehicle when the bumper encounters an obstruction.

BACKGROUND OF THE INVENTION

Prior examples of flexible safety bumpers for self-propelled driverless vehicles have employed an electrical switch, operable to stop the vehicle when the bumper is deflected. The switch may be mechanically connected to the bumper, or incorporated in the construction of the bumper as illustrated by U.S. Pats. 2,920,713 and 3,496,317.

In all of these prior constructions, particularly the patented examples, if the bumper is damaged by striking an obstacle, the switch is also damaged, or at least will not operate properly unless the bumper is replaced or repaired. Bumper damage is a frequent occurrence and has resulted in considerable expense and vehicle down time.

The present invention provides an improved safety bumper and vehicle stopping control which is considerably more tolerant to bumper damage, which can easily be adjusted to compensate for permanent deformation of the bumper, and which thereby materially reduces the need for bumper replacement or repair.

SUMMARY OF THE INVENTION

In accordance with the invention, a vehicle having a deflectable bumper mounted thereon to signal contact with an object is provided with a reflective target secured to the bumper, a light source mounted on the vehicle and directed to the target, and a light sensor mounted on the vehicle so as to normally receive light reflected from the target. The reflective target is movable in response to deflection of the bumper from a reflective to a non-reflective relation to the light sensor, and a vehicle control circuit including the light sensor utilizes a change in the output thereof to initiate a control function, such as stopping the vehicle.

Preferably the reflective target consists of a piece of retro-reflective material removably adhered to the rear side of the bumper and which can readily be moved or replaced in reflective alignment with the light source as may be necessary if the bumper becomes deformed.

Other features and advantages of the invention will appear from the description to follow of the embodiment disclosed in the accompanying drawings.

DESCRIPTION OF THE DRAWINGS

FIG. 2 is an enlarged plan view of the front end of the vehicle of FIG. 1, showing a safety bumper constructed in accordance with the invention;

FIG. 3 is a side elevation of the construction shown in FIG. 2;

DESCRIPTION OF THE PREFERRED EMBODIMENTS

Figure 1:
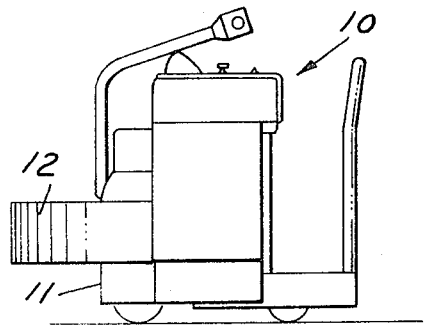
FIG. 1 is a side elevation showing a typical driverless industrial vehicle equipped with a safety bumper.

In FIG. 1, a self-propelled driverless vehicle 10 is equipped with a safety bumper 12 extending forwardly beyond the front 11 of the vehicle.

Referring to FIGS. 2 and 3, the bumper 12 is formed of a flexible strip of sheet metal bent to an arcuate shape, and the ends 14 and 15 of the bumper are mounted on vertically extending hinges 16 and 18 carried by vertical brackets 20 and 22 on the body 24 of the vehicle. The mounting of the bumper includes stops 26 and 28 fastened to the ends 14 and 15 of the bumper and to the movable straps of the hinges 16 and 18, which stops reinforce the bumper ends and hinges and limit pivotal movement of the bumper 12 in directions toward the sides of the vehicle. This mounting of the bumper ends contributes to the flexibility of the bumper.

A small reflective target 30 is secured to the rear surface of the bumper facing the front of the vehicle. This target is preferably made of a retro-reflective material such as the Scotchlite product of Minnesota Mining and Manufacturing Co. and may simply consist of a strip of tape removably adhered to the surface of the bumper 12. Such a retro-reflective material is capable of reflecting to its source light striking the surface of the material at angles up to about 45° from a line perpendicular to the surface of the retro-reflective material.

Figure 5:
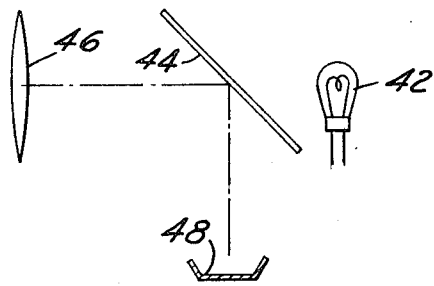
FIG. 5 is a schematic illustration of a photo-electric scanner.

A conventional photoelectric scanner 36 is mounted on a bracket 38 secured to a shelf 34 on the front of the vehicle so as to direct a beam of light indicated by the line 40 to the target 30. The essential components of the photoelectric scanner are schematically shown in FIG. 5 and consists of a light source 42 directing light through a semi-transparent mirror 44 and a collimating lens 46 to provide the narrow beam of light 40. As long as this beam of light strikes the retro-reflective target at an angle within the reflective range thereof, light is reflected back to the photoelectric scanner 36 through the lens 46 and upon striking the semi-transparent mirror 44 is deflected thereby to a light sensor 48.

As best shown in FIG. 3, the target 30 and scanner 36 are relatively positioned so that the light beam 40 from the scanner is directed toward the surface of the bumper 12 at an angle such that the target 30 will be movable in response to deflection of the bumper from a reflective to a non-reflective position relative to the light sensor 48 of the scanner 36. Thus, if the bumper 12 strikes an obstruction head-on, the bumper will be deflected into the position shown by the dash line in FIGS. 2 and 3 and the target 30 will be moved out of the path of the light beam 40. If the bumper 12 strikes an object off-center, so as to be deflected into a position such as indicated by the broken line in FIG. 2, the target 30 will also be moved out of the path of the light beam 40. It can be appreciated from a consideration of FIGS. 2 and 3 that the sensitivity of the arrangement to deflection of the bumper 12 will depend upon the size of the target 30 and the angle at which the light beam is directed toward the surface of the bumper, the sensitivity being increased as the size of the target is decreased and the angle is made more acute.

While an ordinary mirror, mounted perpendicular to the light beam 40 would serve equally well as a target to reflect the light, the retro-reflective target material is preferred because it eliminates the problem of aiming a mirror, and can more easily be secured to the bumper 12.

Moreover, if the bumper is permanently bent out of shape, a strip of retro-reflective tape can easily be peeled from the bumper surface and replaced or repositioned to intersect the light beam 40.

Figure 4:
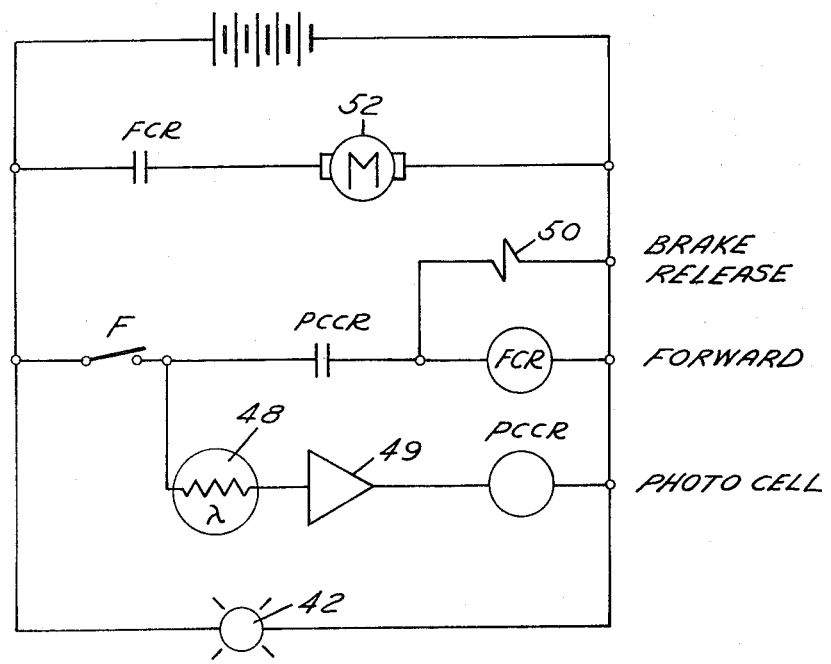
FIG. 4 is a schematic diagram of a control circuit for the vehicle.

FIG. 4 schematically shows the main components of a representative vehicle control circuit utilizing the elements of the scanner 36. When a forward direction control switch F is closed and light from the source 42 is reflected into the photo-cell or light sensor 48, the resulting output thereof through the amplifier 49 will energize a control relay PCCR thereby energizing a forward control relay FCR and the electric brake release coil 50. Relay FCR will energize the vehicle drive motor 52 in a forward direction. If the vehicle encounters an obstruction which deflects the bumper so as to move the target to a non-reflective position relative to the sensor 48, the signal from the sensor will be interrupted, thereby de-energizing the relay PCCR and the relay FCR, de-energizing the vehicle drive motor 52 and the electric brake release 50, and causing the brake (not shown) which is spring applied in a conventional manner, to stop the tractor.

Other control functions may obviously be initiated from a change in the output of the sensor 48, such as visible and audible warning devices.

I claim:

1. In a vehicle having a deflectable bumper mounted thereon to signal contact with an object, the improvement comprising a reflective target secured to the bumper, a light source mounted on the vehicle and capable of directing a light beam to the reflective target, a light sensor mounted on the vehicle so as to normally receive light reflected from the target, the reflective target being movable in response to deflection of the bumper from a reflective to a non-reflective position relative to the light sensor, and vehicle control means connected to the light sensor.

2. A vehicle according to claim 1 wherein said bumper comprises an arcuate flexible member extending beyond the front of said vehicle and means mounting the ends of the flexible member on the vehicle.

3. A vehicle according to claim 2 wherein the mounting means include a hinged connection of the flexible member to the vehicle on a generally vertical axis.

4. A vehicle according to claim 2 wherein the light source is mounted approximately on the longitudinal centerline of the vehicle inwardly of the flexible bumper member, and the reflective target is secured to the inner surface of the flexible bumper member on approximately the longitudinal centerline of the vehicle.

5. A vehicle according to claim 4 wherein the light source is arranged to direct the light beam at an acute angle to the inner surface of the flexible bumper member.

6. A vehicle according to claim 5 wherein the light source and light sensor are optically coincident elements of a photo-electric scanning device.

7. A vehicle according to claim 1 wherein the reflective target includes retro-reflective material.

8. A vehicle according to claim 1 wherein the reflective target comprises a piece of retro-reflective material removably secured to the bumper.

9. A vehicle according to claim 1 wherein the light source is arranged to direct the light beam at an acute angle to the surface of the bumper.

10. A vehicle according to claim 9 wherein the reflective target is made of retro-reflective material and said acute angle is one within the reflective range of said material when the bumper is in a non-deflected position.

11. A vehicle according to claim 1 wherein the light source and light sensor are effectively optically coincident elements of a photo-electric scanning device.

12. A vehicle according to claim 1 wherein the vehicle control means include a sensor relay operable in response to a signal from the light sensor, a vehicle drive motor, a drive motor control circuit, a vehicle brake control circuit, and means for operating the drive motor and brake control circuits in response to operation of the sensor relay.

References Cited

UNITED STATES PATENTS

| | | | |
|---|---|---|---|
| 2,058,283 | 10/1936 | Wolff | 293—84 |
| 2,522,637 | 9/1950 | Pripeton | 340—61 |
| 2,920,713 | 1/1960 | Paradise | 180—94 |
| 3,249,760 | 5/1966 | Miller | 250—231 P |
| 3,353,619 | 11/1967 | Lambert | 180—98 |

BENJAMIN HERSH, Primary Examiner

J. P. SILVERSTRIM, Assistant Examiner

U.S. Cl. X.R.

180—94, 98; 250—216; 340—53, 61; 293—5